US011797311B2

(12) United States Patent
Grassi

(10) Patent No.: US 11,797,311 B2
(45) Date of Patent: *Oct. 24, 2023

(54) ASYNCHRONOUS PIPELINE MERGING USING LONG VECTOR ARBITRATION

(71) Applicant: Micron Technology, Inc., Boise, ID (US)

(72) Inventor: Michael Grassi, Shokan, NY (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/940,731

(22) Filed: Sep. 8, 2022

(65) Prior Publication Data
US 2023/0004398 A1 Jan. 5, 2023

Related U.S. Application Data

(63) Continuation of application No. 17/074,991, filed on Oct. 20, 2020, now Pat. No. 11,467,845.

(51) Int. Cl.
G06F 9/38 (2018.01)
G06F 12/0855 (2016.01)

(52) U.S. Cl.
CPC .......... G06F 9/3871 (2013.01); G06F 9/3842 (2013.01); G06F 12/0855 (2013.01)

(58) Field of Classification Search
CPC .. G06F 9/3871; G06F 9/3842; G06F 12/0828; G06F 12/08555
See application file for complete search history.

(56) References Cited

U.S. PATENT DOCUMENTS

| 11,467,845 B2 | 10/2022 | Grassi |
| 2003/0001851 A1 | 1/2003 | Bushey |
| 2005/0240644 A1 | 10/2005 | Van Berkel et al. |
| 2007/0074009 A1 | 3/2007 | Donofrio et al. |

(Continued)

FOREIGN PATENT DOCUMENTS

WO WO-2022086730 A1 4/2022

OTHER PUBLICATIONS

"International Application Serial No. PCT US2021 054184, International Preliminary Report on Patentability dated May 4, 2023", 5 pages.

(Continued)

Primary Examiner — Courtney P Carmichael-Moody
(74) Attorney, Agent, or Firm — Schwegman Lundberg & Woessner, P.A.

(57) ABSTRACT

Devices and techniques for asynchronous pipeline merging are described herein. An apparatus, includes a memory controller, which includes merge circuitry; where the memory controller chiplet is configured to perform operations including those to: perform a bitwise logical operation on a first logging bit vector and a second logging bit vector to obtain a result vector, wherein the first logging bit vector is associated with a first pipeline and the second logging bit vector is associated with a second pipeline, and wherein bits in respective index positions of the first and second logging bit vectors represent transactions; select a completed transaction from the result vector using a round-robin technique; and forward the completed transaction from the set of completed transactions to an output pipeline.

20 Claims, 5 Drawing Sheets

(56) References Cited

U.S. PATENT DOCUMENTS

| | | |
|---|---|---|
| 2009/0276608 A1 | 11/2009 | Shimada et al. |
| 2011/0099355 A1 | 4/2011 | Tran |
| 2011/0289180 A1 | 11/2011 | Sonnier et al. |
| 2018/0024837 A1 | 1/2018 | Sadowski et al. |
| 2020/0081838 A1* | 3/2020 | Kanchana ............ G06F 12/0831 |
| 2020/0081840 A1 | 3/2020 | Kaushikkar et al. |
| 2022/0121577 A1 | 4/2022 | Grassi |

OTHER PUBLICATIONS

"International Application Serial No. PCT/US2021/054184, International Search Report dated Feb. 3, 2022", 3 pgs.

"International Application Serial No. PCT/US2021/054184, Written Opinion dated Feb. 3, 2022", 3 pgs.

* cited by examiner

US 11,797,311 B2

ASYNCHRONOUS PIPELINE MERGING USING LONG VECTOR ARBITRATION

PRIORITY APPLICATION

This application is a continuation of U.S. application Ser. No. 17/074,991, filed Oct. 20, 2020, which is incorporated herein by reference in its entirety.

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits (ICs), or "chips", potentially in combination with discrete circuit components, and commonly coupled to a respective substrate to facilitate attachment to the interposer. Most or all chiplets in a system may be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
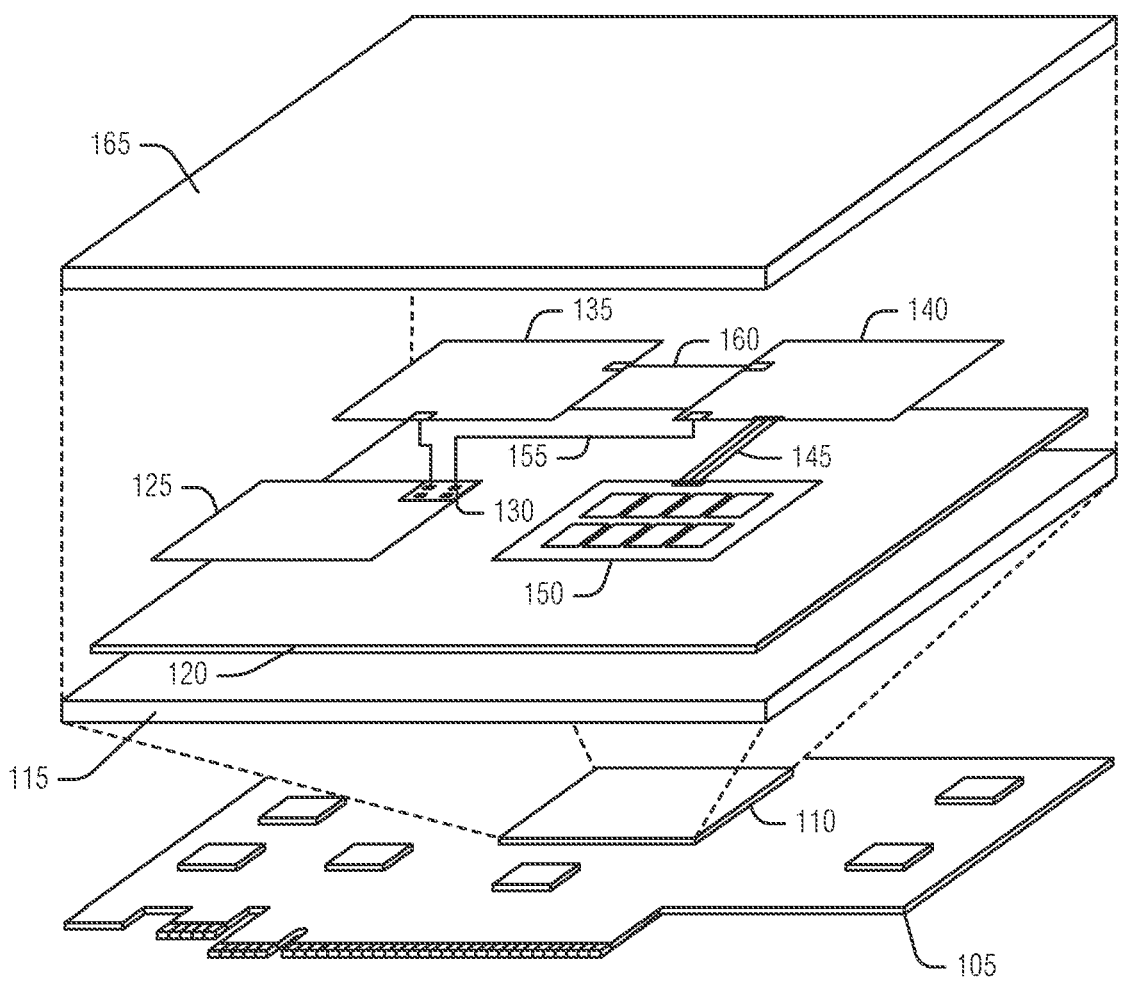
FIGS. 1A and 1B illustrate an example of a chiplet system, according to an embodiment.
Figure 1B:
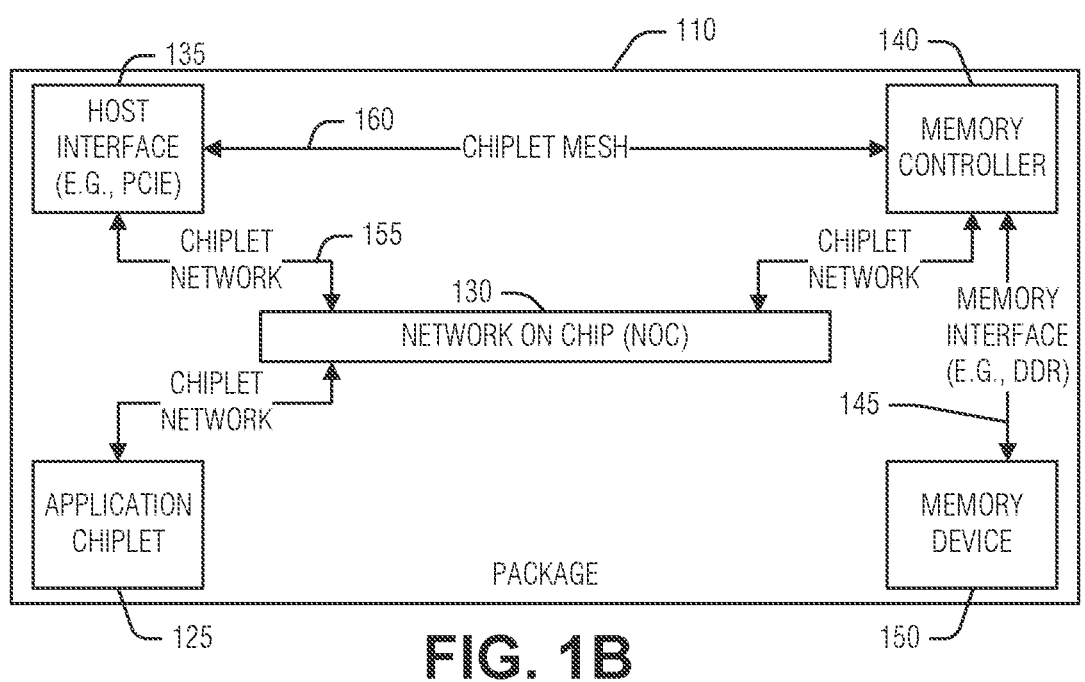

FIGS. 1A-1B, described below, offers an example of a chiplet system and the components operating therein. The illustrated chiplet system includes a memory controller. Additional details about the memory controller are described below with respect to FIGS. 1A-1B and 2.

As described further below, the memory controller can include a local cache for off-die memory (e.g., dynamic random access memory (DRAM). The memory controller may receive a memory request. The memory controller then attempts to satisfy the request from the cache. If the requested data is not found in cache, the data is retrieved from off-die memory. Generally, in comparison to each other, the cache is considered a fast path with low latency and the off-die memory access is considered a slow path with higher latency. Because some memory requests may be satisfied by cache while others may need to access off-die memory, any memory requests that are satisfied by a combination of cache and off-die memory fetch can present timing issues for coordinating these accesses with other units in a pipeline.

Although the issue is posed in the context of a memory request, the presently disclosed implementation may be applied to any system where operations are executed in parallel asynchronous paths. In such systems, the operations may need to be eventually combined or coordinated before being forwarded further into a compute pipeline. If the parallel processing pipelines have characteristics that can cause related operations to have very different and unpredictable response times, these responses need to be logged independently and asynchronously.

In order to address these issues, the present disclosure discusses the use of vectors that are used to represented transactions, such as memory request transactions, in a parallel path pipeline. Each vector may be associated with one path. Each thread, operation, instruction, or transaction that is executing in the parallel paths is represented at a shared bit index in the vectors. Once the transaction is complete, as represented by bit values in the shared bit index, the data of each path may be merged and used in further processing down the pipeline. The bit values represent a sub-completion step in the operation. This marshalling and merging of data across asynchronous multi-path pipelines, maintains integrity across portions of transactions regardless of the varying latencies for the different paths. As a result, the systems and techniques described here are able to accommodate a large number of in-flight operations, which may have vastly different timing.

Using a bitwise AND operation between the logging vectors, the completed transactions are easy to identify. Every pair of comparable bits in each vector is ANDed making a third vector of the same length. This vector essentially takes the sub-completion logging vectors and determines which sets of bits in comparable positions are ready for further completion processing.

This third vector is fed to a wide, fast, fair Round-Robin arbiter, the width being equal to the length of the vectors. The arbiter will ensure that pairs or sets of sub-completion bits meeting the completion criteria will be handled completely and fairly. Once the arbiter grants completion status to a set of sub-completion bits, those sub-completion bits are cleared, and the processing goes forward into the next stage of the pipeline for the transaction associated with the set of sub-completion bits.

Without the control mechanism discussed herein, transactions may have to wait for memory access from the slowest path (e.g., a memory request to an off-die memory device). The pipeline may stall or become significantly inefficient. These stall cycles result in wasted time and energy.

The control mechanism provides distinct advantages by allowing transactions to complete asynchronously and independently. Overall pipeline throughput is increased, and power draw is reduced as fewer resources are wasted due to stalled operations. These efficiencies can be of particular benefit in a chiplet system including a memory controller, as such systems offer modular capabilities that can, in some embodiments, be configured for enabling relatively high performance memory operations required for systems performing a large number of, and/or relatively high complexity computations.

For example, various forms of navigation-directed systems may need to coordinate data from multiple sensors essentially simultaneously to perform the navigation function. An example use for such a chiplet system implementing a memory system including a memory controller with one or more forms of memory would be a self-driving vehicle in which data from various ranging sensors such as radar, lidar, and/or ultrasonic sensors, may be correlated with data from multiple optical sensors (potentially requiring image processing and pattern identification), gyroscopes, skid sensors, etc.

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe) interface, for example. The chiplet system 110 includes a package substrate 115, an interposer 120, and four chiplets: an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB control or subordinate (i.e., "master" or "slave") depending on which chiplet provides the master clock. AIB I/O cells support three clocking modes: asynchronous (i.e., non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e., 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across connected chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or a memory controller at some times, and at other times controlled by the DRAM memory device, or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the command's success to the application chiplet 125. Atomic operations avoid transmitting the data across the chiplet network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 140. FIGS. 1A and 1B illustrate an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM, synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 5:
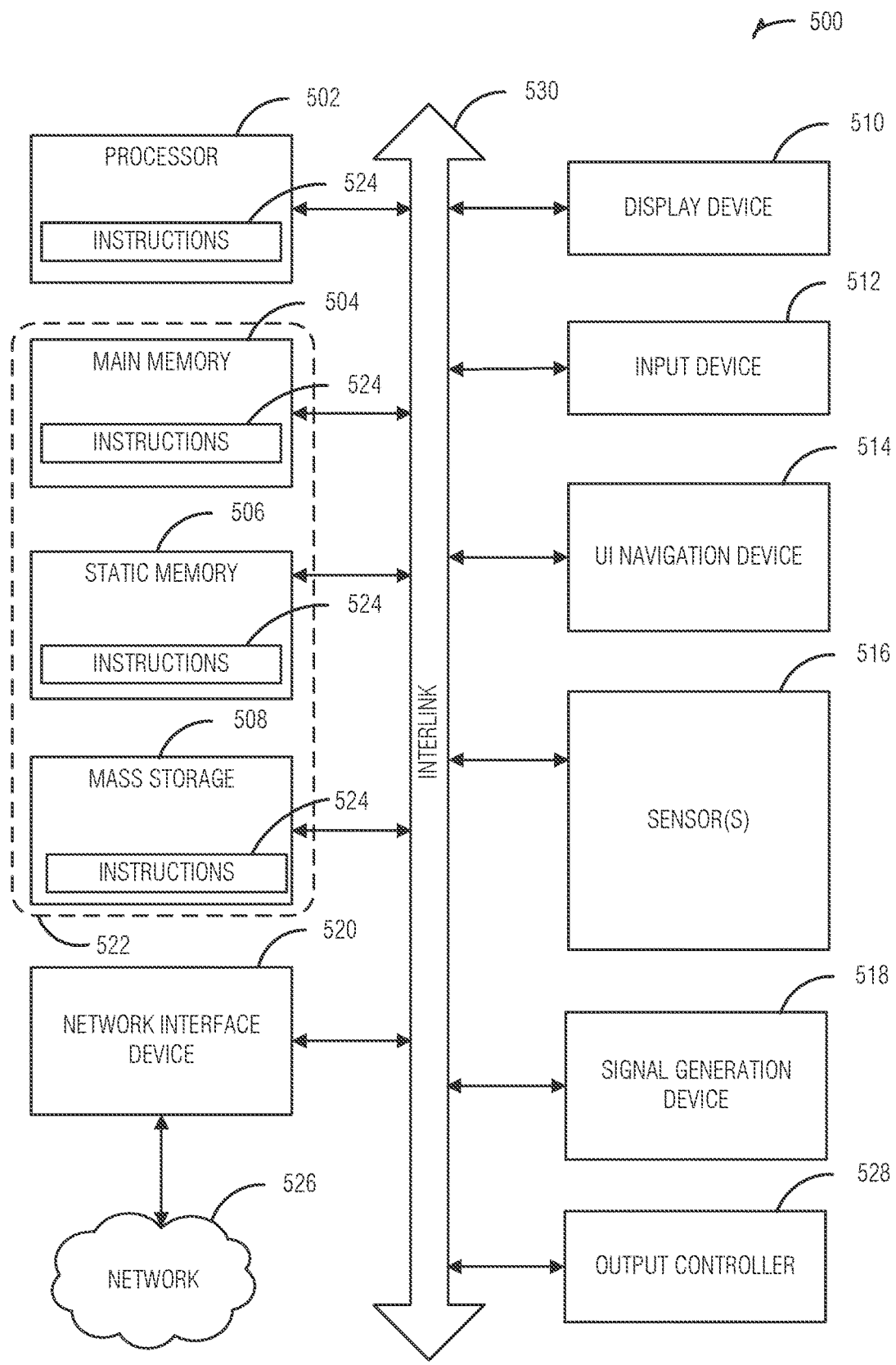
FIG. 5 is a block diagram of an example of a machine with which, in which, or by which embodiments of the present disclosure can operate.

FIG. 5 illustrates components of an example of a memory controller chiplet 505, according to an embodiment. The memory controller chiplet 505 includes a cache 510, a cache controller 515, an off-die memory controller 520 (e.g., to communicate with off-die memory 575), a network communication interface 525 (e.g., to interface with a chiplet network 585 and communicate with other chiplets), and a set of atomic and merge units 550. Members of this set can include, for example, a write merge unit 555, a memory hazard unit 560, built-in atomic unit 565, or a PAU 570. The various components are illustrated logically, and not as they necessarily would be implemented. For example, the built-in atomic unit 565 likely comprises different devices along a path to the off-die memory. For example, the built-in atomic unit 565 could be in an interface device/buffer on a memory chiplet, as discussed above. In contrast, the programmable atomic unit 570 could be implemented in a separate processor on the memory controller chiplet 505 (but in various examples may be implemented in other locations, for example on a memory chiplet).

The off-die memory controller 520 is directly coupled to the off-die memory 575 (e.g., via a bus or other communication connection) to provide write operations and read operations to and from the one or more off-die memory devices, such as off-die memory 575 and off-die memory 580. In the depicted example, the off-die memory controller 520 is also coupled for output to the atomic and merge unit 550, and for input to the cache controller 515 (e.g., a memory side cache controller).

In the example configuration, cache controller 515 is directly coupled to the cache 510, and may be coupled to the network communication interface 525 for input (such as incoming read or write requests), and coupled for output to the off-die memory controller 520.

The network communication interface 525 includes a packet decoder 530, network input queues 535, a packet encoder 540, and network output queues 545 to support a packet-based chiplet network 585, such as CPI. The chiplet network 585 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 585 can be implemented as a collection of crossbar switches having a folded Clos configuration, or a mesh network providing for additional connections, depending upon the configuration.

In various examples, the chiplet network 585 can be part of an asynchronous switching fabric. Here, a data packet can be routed along any of various paths, such that the arrival of any selected data packet at an addressed destination can occur at any of multiple different times, depending upon the routing. Additionally, chiplet network 585 can be implemented at least in part as a synchronous communication network, such as a synchronous mesh communication network. Both configurations of communication networks are contemplated for use for examples in accordance with the present disclosure.

The memory controller chiplet 505 can receive a packet having, for example, a source address, a read request, and a physical address. In response, the off-die memory controller 520 or the cache controller 515 will read the data from the specified physical address (which can be in the off-die memory 575 or in the cache 510), and assemble a response packet to the source address containing the requested data. Similarly, the memory controller chiplet 505 can receive a packet having a source address, a write request, and a physical address. In response, the memory controller chiplet 505 will write the data to the specified physical address (which can be in the cache 510 or in the off-die memories 575 or 580), and assemble a response packet to the source address containing an acknowledgement that the data was stored to a memory.

Thus, the memory controller chiplet 505 can receive read and write requests via the chiplet network 585 and process the requests using the cache controller 515 interfacing with the cache 510, if possible. If the request cannot be handled by the cache controller 515, the off-die memory controller 520 handles the request by communication with the off-die memories 575 or 580, the atomic and merge unit 550, or both. As noted above, one or more levels of cache may also be implemented in off-die memories 275 or 280; and in some such examples may be accessed directly by cache controller 215. Data read by the off-die memory controller 520 can be cached in the cache 510 by the cache controller 515 for later use.

The atomic and merge unit 250 are coupled to receive (as input) the output of the off-die memory controller 220, and to provide output to the cache 210, the network communication interface 225, or directly to the chiplet network 285. The memory hazard unit 560, write merge unit 555 and the built-in (e.g., predetermined) atomic unit 565 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 570 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 555 receives read data and request data, and merges the request data and read data to create a single unit having the read data and the source address to be used in the response or return data packet). The write merge unit 555 provides the merged data to the write port of the cache 510 (or, equivalently, to the cache controller 515 to write to the cache 510). Optionally, the write merge unit 555 provides the merged data to the network communication interface 525 to encode and prepare a response or return data packet for transmission on the chiplet network 585.

When the request data is for a built-in atomic operation, the built-in atomic unit 565 receives the request and reads data, either from the write merge unit 555 or directly from the off-die memory controller 520. The atomic operation is performed, and using the write merge unit 555, the resulting data is written to the cache 510, or provided to the network communication interface 525 to encode and prepare a response or return data packet for transmission on the chiplet network 585.

The built-in atomic unit 565 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 585. The request packet has a physical address, atomic operator type, operand size, and optionally up to 32-bytes of data. The atomic operation performs the read-modify-write to a cache memory line of the cache 510, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics—such as fetch-and-increment or compare-and-swap—which will occur with the same throughput as a regular memory read or write operation not involving an atomic operation. For these operations, the cache controller 515 may generally reserve a cache line in the cache 510 by setting a hazard bit (in hardware), so that the cache line cannot be read by another process while it is in transition. The data is obtained from either the off-die memory 575 or the cache 510, and is provided to the built-in atomic operation unit 565 to perform the requested atomic operation. Following the atomic operation, in addition to providing the resulting data to the packet encoder 540 to encode outgoing data packets for transmission on the chiplet network 585, the built-in atomic operation unit 565 provides the resulting data to the write merge unit 555, which will also write the resulting data to the cache 510. Following the writing of the resulting data to the cache 510, any corresponding hazard bit which was set will be cleared by the memory hazard unit 560.

The PAU 570 enables high performance (high throughput and low latency) for programmable atomic operations (also referred to as "custom atomic transactions" or "custom atomic operations"), comparable to the performance of built-in atomic operations. Rather than executing multiple memory accesses, in response to an atomic operation request designating a programmable atomic operation and a memory address, circuitry in the memory controller chiplet 505 transfers the atomic operation request to PAU 570 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 570 executing the programmable atomic operations allow for additional write operations without any limitations imposed by the bandwidth of the communication networks and without increasing any congestion of the communication networks.

The PAU 570 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 570 can be embodied as one or more hybrid threading processors. In some example embodiments, the PAU 570 provides barrel-style, round-robin instantaneous thread switching to maintain a high instruction-per-clock rate.

Programmable atomic operations can be performed by the PAU 570 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the built-in atomic operations, insofar as they are defined by the user rather than a system vendor. For these operations, the cache controller 515 can reserve a cache line in the cache 510, by setting a hazard bit (in hardware), so that cache line cannot be read by another process while it is in transition. The data is obtained from either the cache 510 or the off-die memories 575 or 580, and is provided to the PAU 570 to perform the requested programmable atomic operation. Following the atomic operation, the PAU 570 will provide the resulting data to the network communication interface 525 to directly encode outgoing data packets having the resulting data for transmission on the chiplet network 585. In addition, the PAU 570 will provide the resulting data to the cache controller 515, which will also write the resulting data to the cache 510. Following the writing of the resulting data to the cache 510, any corresponding hazard bit which was set will be cleared by the cache control circuit 515.

In selected examples, the approach taken for programmable atomic operations is to provide multiple, generic, custom atomic request types that can be sent through the chiplet network 585 to the memory controller chiplet 505 from an originating source such as a processor or other system component. The cache controllers 515 or off-die memory controller 520 identify the request as a custom atomic and forward the request to the PAU 570. In a representative embodiment, the PAU 570: (1) is a programmable processing element capable of efficiently performing a user defined atomic operation; (2) can perform load and stores to memory, arithmetic and logical operations and control flow decisions; and (3) leverages the RISC-V ISA with a set of new, specialized instructions to facilitate interacting with such controllers 515, 520 to atomically perform the user-defined operation. In desirable examples, the RISC-V ISA contains a full set of instructions that support high level language operators and data types. The PAU 570 can leverage the RISC-V ISA, but will commonly support a more limited set of instructions and limited register file size to reduce the die size of the unit when included within the memory controller chiplet 505.

As mentioned above, prior to the writing of the read data to the cache 510, the set hazard bit for the reserved cache line is to be cleared, by the memory hazard clear unit 560. Accordingly, when the request and read data is received by the write merge unit 555, a reset or clear signal can be transmitted by the memory hazard clear unit 560 to the cache 510 to reset the set memory hazard bit for the reserved cache line. Also, resetting this hazard bit will also release a pending read or write request involving the designated (or reserved) cache line, providing the pending read or write request to an inbound request multiplexer for selection and processing.

The merge circuitry 290 is configured to merge various responses from the cache 210 and the off-die memory (e.g., off-die memory 275) in response to a memory request (e.g., received from the packet decoder 230) before delivery in a memory response (e.g., via packet encoder 240). As illustrated, the merge circuitry 290 can have components in the cache controller 215, the off-die memory controller 220, or any other location in which memory requests (e.g., transactions) can be tracked and completed (e.g., merged).

As noted above, the response times between the cache 210 and the off-die memory 275, 280 can vary greatly, creating a challenge to track and reassemble responses for a memory request transaction. Although various parallel pipelines can exist in the memory controller 205, an example of a two-path parallel pipeline includes memory retrievals from the cache 210 and an off-die memory. An example of a three-way parallel pipeline may include access to the cache 210, a fast off-die memory (e.g., off-die memory 275 is DRAM), and a slow off-die memory (e.g., off-die memory 280 is flash).

To track parallel operations in a transaction, a logging vector is used for each of the paths. Within each logging vector, the bit positions are represented by indexes. The index positions between each vector is shared such that a transaction associated with a given index in one vector is also associated with the same index in other vectors. The logging vectors of each path is then straightforward to use to determine whether a given transaction has completed all operations in each of the parallel paths by comparing the vector values of bits positioned at the index of the transaction.

When an operation for a transaction is complete, the completion is logged in a logging vector associated with the pipeline at a position that corresponds to the transaction. In an embodiment, a controller associated with the pipeline (e.g., cache controller 215 or off-die memory controller 220) logs the completion of the operation (e.g., a memory read completion). In another embodiment, the merge circuitry 290 is configured to log the completion in a logging vector for the pipeline.

The logging vector is one of a set of logging vectors with each of the set of logging vectors uniquely assigned to a respective set of parallel pipelines. Thus, each parallel pipeline has its own logging vector in the set of logging vectors. Moreover, a given index in any vector corresponds to a transaction such that the same index in each vector corresponds to the same transaction. Generally, transaction 0 will be index 0 across all vectors of the set of vectors. Accordingly, if pipeline A completes transaction 0 and pipeline B has not, index 0 of pipeline A's vector will indicate that the transaction is complete and index 0 of pipeline B's vector will indicate that the transaction is not complete. This may be performed using logic one for complete and logic zero for incomplete. Although it is understood that the logic may be inverted in some implementations.

Each logging vector may be a bit vector, such that each element of a logging vector holds a single bit. The bit vector can be represented with one or more words in registers of the merge circuitry 290. Such a representation can be convenient to implement, both in storage of the vector as well as comparing vectors to one another to determine whether a given transaction is complete as described below. In an example, to mark an element in a bit vector, the merge circuitry 290 is configured to set a position of the bit vector to a logical one. Using the logical one to indicate completion and a logical zero to indicate that the transaction is not complete can be convenient when using standard bitwise comparison operations, such as a bitwise AND operation or a bitwise OR operation, to compare transaction status over several pipelines.

The merge circuitry 290 is configured to compare corresponding elements from two or more logging vectors. The comparison may be performed based on an event. The event may be when an element is marked as being complete, an expiration of an interval, upon an interrupt from the cache controller 215 or the off-die memory controller 220, or other triggering events. The comparison determines which transactions are complete. Thus, the merge circuitry 290 is configured to compare the transaction complete indications in a given index across the logging vectors of the parallel pipelines. For example, if index 1 of the vector for pipeline A and index 1 of the vector for pipeline B both indicate completion, then the transaction 1 that corresponds to index 1 is considered complete.

In an example, when the vectors are bit vectors, the merge circuitry 290 is configured to compare elements in the members of the set of bit vectors by performing a bitwise operation upon entire members (e.g., upon all indices in the vectors). For example, given three 256-bit vectors, a logical AND operation is performed between all three vectors to produce a single 256-bit result vector. Such an operation can generally be implemented within a single clock cycle. In an example, the bitwise operation is an AND operation. In an example, the transaction is complete when the result of the AND operation that corresponds to the transaction index is a logical one. The AND operation, with transaction completions being marked with a logical one, is a convenient mechanism to determine that every vector is complete because a logical one in a given index of the result vector can only be obtained with a logical one at the same index in all of the parallel pipeline vectors.

In some implementations, it is possible for a transaction to be complete if fewer than all pipelines complete. For example, if the transaction involves a single memory data unit, then either the cache 210 or the off-die memory satisfies the transaction. However, both locations can be checked in parallel to avoid, for example, latency associated with waiting for a cache miss before making the off-die memory inquiry. In these examples, the merge circuitry 290 can be configured to use a bitwise OR operation as the bitwise operation. In an example, the transaction is complete when the result of the OR operation that corresponds to the transaction index is a logical one. As long as any pipeline vector has a logical one at the transaction index, the transaction is complete. Because the implementation of a bitwise AND and a bitwise OR can consume little hardware area in the merge circuitry 290, both can be included and performed on each clock cycle, for example. In this type of implementation, the merge circuitry has two result vectors. The merge circuitry 290 may consult the appropriate result vector based on metadata about each transaction. Thus, the AND result vector can be consulted for a transaction when all pipelines must complete for the transaction to be considered complete, and the OR vector can be consulted when only one pipeline must complete for the transaction to be considered complete.

Using the result vector, the merge circuitry 290 is configured to release the corresponding transaction to the rest of the pipeline. This may include creation and delivery of a memory response over a network-on-chip (NOC), processing additional related memory requests, or the like.

A round-robin arbiter in the merge circuitry 290 is used to ensure that a completed transaction is handled fairly. When the arbiter releases the transaction to the remaining pipeline, the corresponding bits are cleared in the logging vectors. To release the transaction to the remaining pipeline, the arbiter may write transaction data, metadata, or other information to a pipeline buffer. In an example, the merge circuitry 290 is configured to read completed transactions out of the result vector in a round-robin sequence.

A round-robin arbiter may be used to provide this functionality. Various round-robin arbiter designs may be used. For instance, a mask vector may be used to mask completed indexes out of the result vector over successive cycles. The mask vector may be updated after each transaction is forwarded to service the next higher completed index. The mask may be updated until the entire request vector is masked, at which time the mask is reset and the lowest completed index in the result vector can be identified. As such, in an example, the arbiter in the merge circuitry 290 can identify the lowest index of completed transactions and forward the transaction associated with this index to the remaining pipeline. This implementation provide wrap-around functionality and fair round-robin service.

Figure 2:
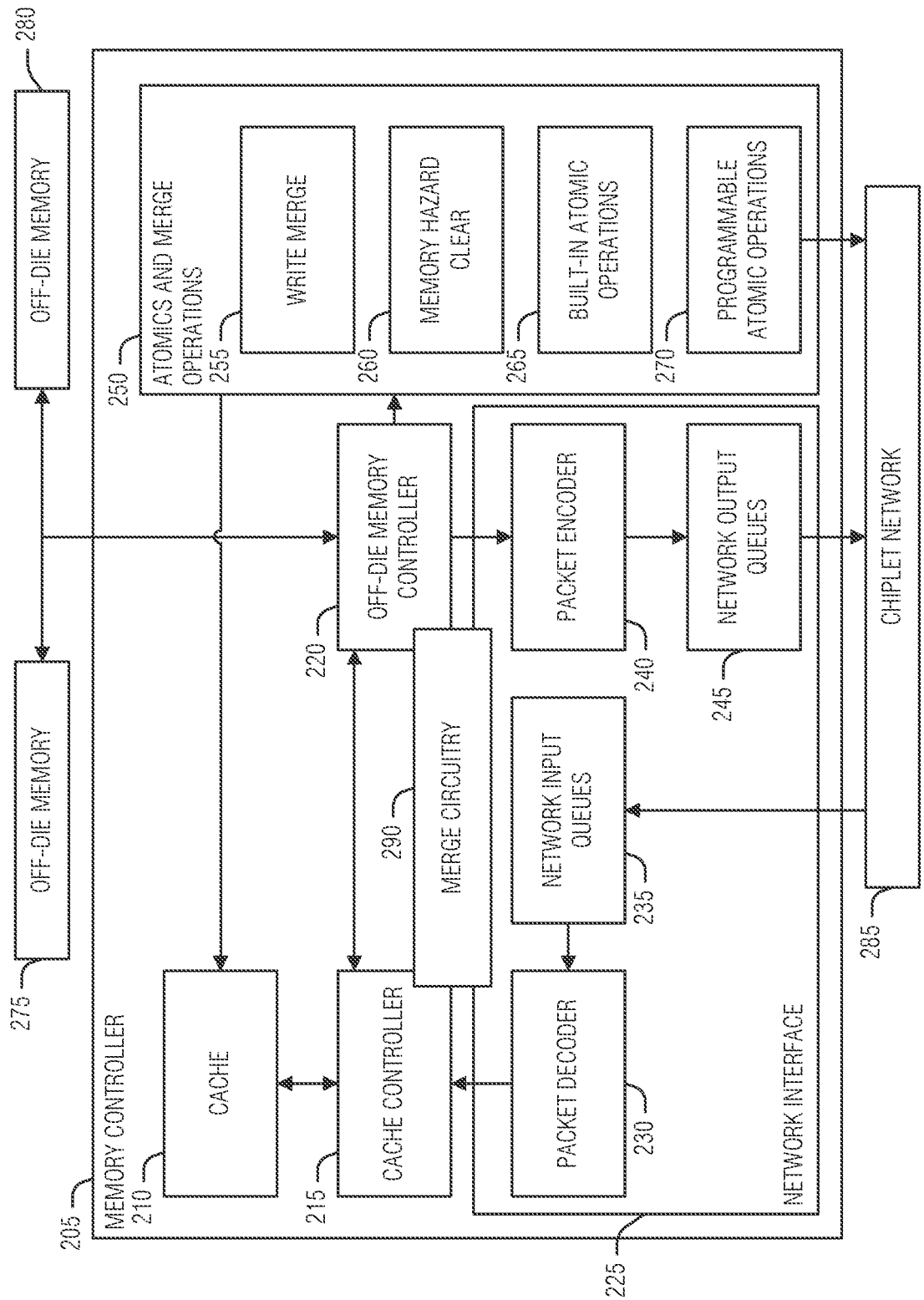
FIG. 2 illustrates components of an example of a memory controller chiplet, according to an embodiment.
Figure 3:
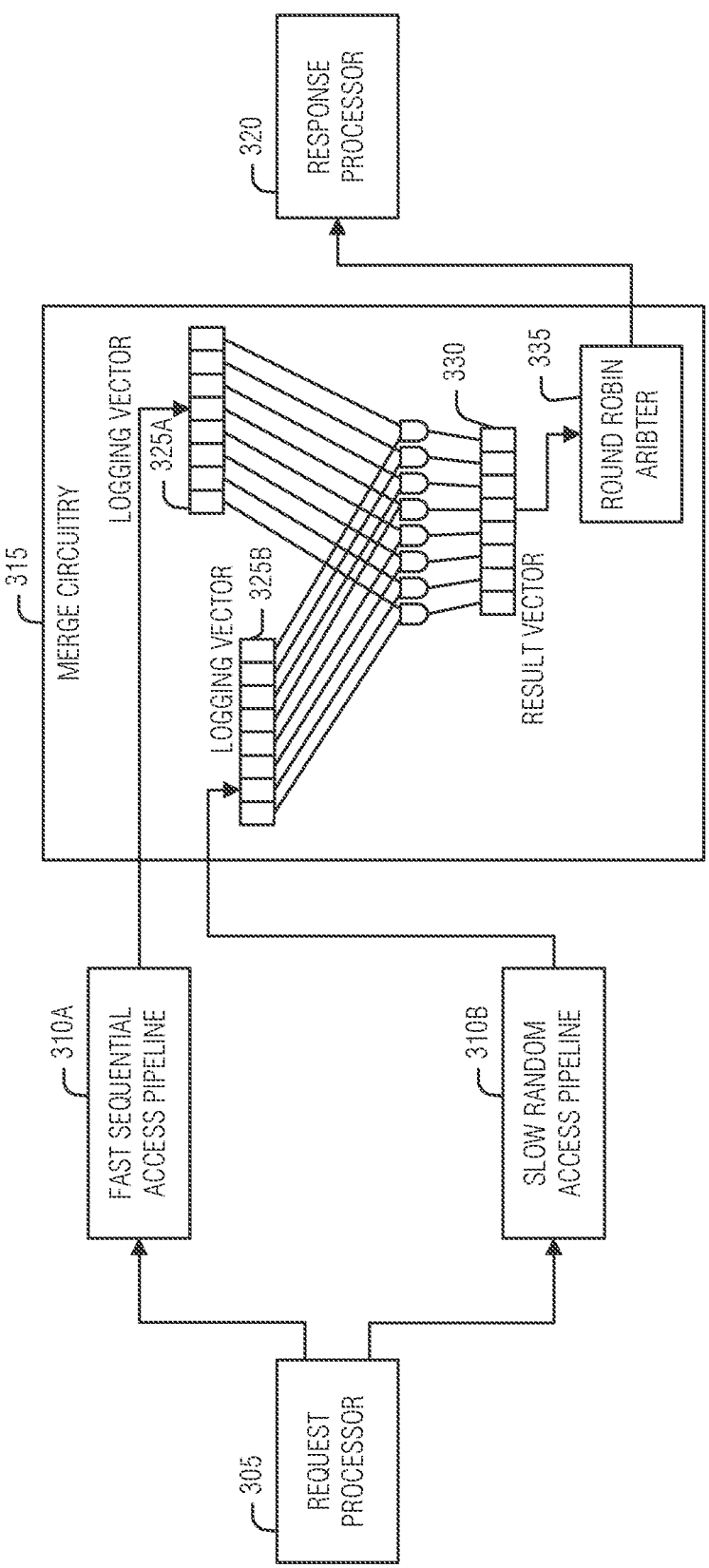
FIG. 3 illustrates processing flow through electronic components, according to an embodiment.

FIG. 3 illustrates processing flow through electronic components, according to an embodiment. As illustrated, there is a request processor 305 (e.g., the packet decoder 230 from FIG. 2) that processing incoming transaction requests. Transaction requests may be memory requests. The request processor 305 can split a transaction and initiate a first request using a fast sequential access pipeline 310A (e.g., memory access to cache 210) and initiate a second request using a slow random access pipeline 310B (e.g., memory access to off-die memory 280). These sub-requests proceed independently and asynchronously. It is understood that more than two pipelines may be used.

A merge circuitry 315 (e.g., merge circuitry 290) merges results from the fast pipeline 310A and the slow pipeline 310B and provides the results to a response processor 310 (e.g., the packet encoder 240 from FIG. 2).

The merge circuitry 315 accesses logging vectors 325A, 325B associated with the fast sequential access pipeline 310A and the slow random access pipeline 310B. The logging vectors are combined using logic to produce a result vector 330. Round-robin arbiter 335 selects a completed transaction from the result vector 330 and forwards the transaction to the response processor 320.

The logging vectors 325A, 325B are used to capture and maintain status of the associated transactions. The transaction data may be stored in an associative memory. The memory may be implemented as registers and store relationships between a transaction index identifier and payload data (e.g., memory request results from fast or slow memory access pipelines). The merge circuitry 315 may access the associative memory to obtain the corresponding data and forward the data to the response processor 320. Alternatively, the merge circuitry 315 may forward the index of the transaction to the response processor 320, which then may use the index to lookup the transaction data. The transaction data may be a requested byte, word, or other addressable unit of data, requested from memory by the requestor. The transaction data may then be returned to the original requestor by the response processor 320.

Figure 4:
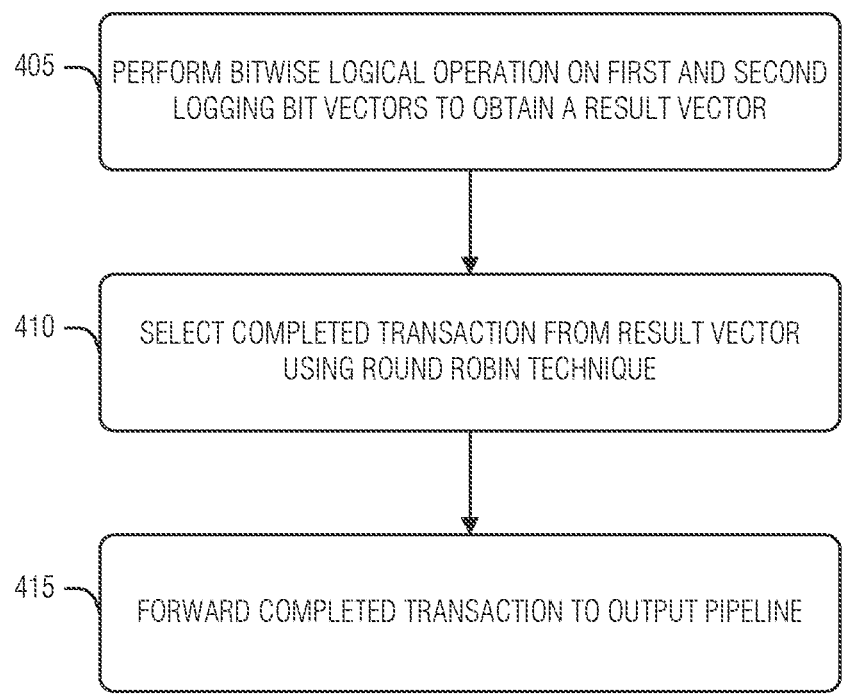
FIG. 4 is a flow chart of an example of a method for asynchronous pipeline merging, according to an embodiment.

FIG. 4 is a flow chart of an example of a method 400 for asynchronous pipeline merging in a merge circuit, according to an embodiment. Operations of the method 400 are performed by computer hardware, such as that described with respect to FIGS. 1A-1B (e.g., memory controller chiplet), FIG. 2 (e.g., merge circuitry 290), FIG. 3, or FIG. 5 (e.g., processing circuitry). At 405, a bitwise logical operation is performed on a first logging bit vector and a second logging bit vector to obtain a result vector. The first logging bit vector is associated with a first pipeline and the second logging bit vector is associated with a second pipeline. Bits in respective index positions of the first and second logging bit vectors represent transactions.

In an embodiment, the first pipeline comprises a fast sequential access pipeline. In a related embodiment, the second pipeline comprises a slow random access pipeline.

In an embodiment, the first logging bit vector and the second logging bit vector are of the same size. In a related embodiment, the first logging bit vector and the second logging bit vector are each 256 bits.

At 410, a completed transaction is selected from the result vector using a round-robin technique. In an embodiment, the first and second logging bit vectors store a logical one to indicate completion in the respective first and second pipeline. In a further embodiment, the bitwise logical operation is an AND operation, and wherein transactions that correspond to a logical one in the result vector are considered complete. In another embodiment, the bitwise logical operation is an OR operation, and wherein transactions that correspond to a logical one in the result vector are considered complete.

In an embodiment, a controller associated with the first pipeline sets a bit the first logging bit vector for a transaction executing in the first pipeline, the bit representing a completion status of the transaction executing in the first pipeline.

In an embodiment, the merge circuitry sets a bit the first logging bit vector for a transaction executing in the first pipeline, the bit representing a completion status of the transaction executing in the first pipeline.

At 415, the completed transaction from the set of completed transactions is forwarded to an output pipeline. The output pipeline may include the response processor 320. In an embodiment, forwarding the completed transaction comprises transmitting an index of the result vector corresponding to the completed transaction. In another embodiment, forwarding the completed transaction includes using an index of the result vector corresponding to the completed transaction to obtain transaction data corresponding to the completed transaction and transmitting the transaction data to the output pipeline. In a further embodiment, the transaction data comprises data related to a memory request.

In an embodiment, the method 400 includes clearing bits at an index of the first and second logging bit vectors that corresponds to the completed transaction.

In an embodiment, the merge circuitry is included in a memory controller chiplet (e.g., memory controller chiplet 140) in a chiplet system (e.g., chiplet system 110). In a further embodiment, the merge circuitry is disposed on an output path of the memory controller chiplet, the output path being between the memory controller chiplet and memory managed by the memory controller chiplet. In a further embodiment, memory managed by the memory controller includes memory on the memory controller chiplet (e.g., cache 210) and memory that is not on the memory controller chiplet (e.g., off-die memory 275 or off-die memory 280).

FIG. 5 illustrates a block diagram of an example machine 500 with which, in which, or by which any one or more of the techniques (e.g., methodologies) discussed herein can be implemented. Examples, as described herein, can include, or can operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership can be flexible over time. Circuitries include members that can, alone or in combination, perform specified operations when operating; thus. processing circuitry in various instances, for example in various controllers as described in the specification, can include one or more processors, or cores of processors, or other instruction-executing devices. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 can include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which can communicate with each other via an interlink (e.g., bus) 530. The machine 500 can further include a display unit 510, an alphanumeric input device 512 (e.g., a keyboard), and a user interface (UI) navigation device 514 (e.g., a mouse). In an example, the display unit 510, input device 512 and UI navigation device 514 can be a touch screen display. The machine 500 can additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 can include an output controller 528, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 can be, or include, a machine readable medium 522 on which is stored one or more sets of data structures or instructions 524 (e.g., software) embodying or utilized by any one or more of the techniques or functions described herein. The instructions 524 can also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 can constitute the machine readable media 522. While the machine readable medium 522 is illustrated as a single medium, the term "machine readable medium" can include a single medium or multiple media (e.g., a centralized or distributed database, or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 can be representative of the instructions 524, such as instructions 524 themselves or a format from which the instructions 524 can be derived. This format from which the instructions 524 can be derived can include source code, encoded instructions (e.g., in compressed or encrypted form), packaged instructions (e.g., split into multiple packages), or the like. The information representative of the instructions 524 in the machine readable medium 522 can be processed by processing circuitry into the instructions to implement any of the operations discussed herein. For example, deriving the instructions 524 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 can include assembly, compilation, or interpretation of the information (e.g., by the processing circuitry) to create the instructions 524 from some intermediate or preprocessed format provided by the machine readable medium 522. The information, when provided in multiple parts, can be combined, unpacked, and modified to create the instructions 524. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 can be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the communications network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

Example 1 is an apparatus, comprising: memory configured as a cache; an interface couplable to off-die memory; and merge circuitry coupled to the interface and the memory configured as the cache, the merge circuitry configured to: perform a bitwise logical operation on a first logging bit vector and a second logging bit vector to obtain a result vector, wherein the first logging bit vector is associated with a first pipeline and the second logging bit vector is associated with a second pipeline, and wherein bits in respective index positions of the first and second logging bit vectors represent transactions; select a completed transaction from the result vector using a round-robin technique; and forward the completed transaction from the set of completed transactions to an output pipeline.

In Example 2, the subject matter of Example 1 includes, wherein the first and second logging bit vectors store a logical one to indicate completion in the respective first and second pipeline.

In Example 3, the subject matter of Example 2 includes, wherein the bitwise logical operation is an AND operation, and wherein transactions that correspond to a logical one in the result vector are considered complete.

In Example 4, the subject matter of Examples 2-3 includes, wherein the bitwise logical operation is an OR operation, and wherein transactions that correspond to a logical one in the result vector are considered complete.

In Example 5, the subject matter of Examples 1-4 includes, wherein a controller associated with the first pipeline sets a bit the first logging bit vector for a transaction executing in the first pipeline, the bit representing a completion status of the transaction executing in the first pipeline.

In Example 6, the subject matter of Examples 1-5 includes, wherein the merge circuitry sets a bit the first logging bit vector for a transaction executing in the first pipeline, the bit representing a completion status of the transaction executing in the first pipeline.

In Example 7, the subject matter of Examples 1-6 includes, wherein forwarding the completed transaction comprises transmitting an index of the result vector corresponding to the completed transaction.

In Example 8, the subject matter of Examples 1-7 includes, wherein forwarding the completed transaction comprises: using an index of the result vector corresponding to the completed transaction to obtain transaction data corresponding to the completed transaction; and transmitting the transaction data to the output pipeline.

In Example 9, the subject matter of Example 8 includes, wherein the transaction data comprises data related to a memory request.

In Example 10, the subject matter of Examples 1-9 includes, wherein the memory controller is to perform operations including: clearing bits at an index of the first and second logging bit vectors that corresponds to the completed transaction.

In Example 11, the subject matter of Examples 1-10 includes, wherein the first pipeline comprises a fast sequential access pipeline.

In Example 12, the subject matter of Examples 1-11 includes, wherein the second pipeline comprises a slow random access pipeline.

In Example 13, the subject matter of Examples 1-12 includes, wherein the first logging bit vector and the second logging bit vector are of the same size.

In Example 14, the subject matter of Examples 1-13 includes, wherein the first logging bit vector and the second logging bit vector are each 256 bits.

In Example 15, the subject matter of Examples 1-14 includes, wherein the merge circuitry is included in a memory controller chiplet in a chiplet system.

In Example 16, the subject matter of Example 15 includes, wherein the merge circuitry is disposed on an output path of the memory controller chiplet, the output path being between the memory controller chiplet and memory managed by the memory controller chiplet.

In Example 17, the subject matter of Example 16 includes, wherein memory managed by the memory controller includes memory on the memory controller chiplet and memory that is not on the memory controller chiplet.

Example 18 is a method, comprising: performing, by a memory controller having merge circuitry, a bitwise logical operation on a first logging bit vector and a second logging bit vector to obtain a result vector, wherein the first logging bit vector is associated with a first pipeline and the second logging bit vector is associated with a second pipeline, and wherein bits in respective index positions of the first and second logging bit vectors represent transactions; selecting, by the memory controller having merge circuitry, a completed transaction from the result vector using a round-robin technique; and forwarding, by the memory controller having merge circuitry, the completed transaction from the set of completed transactions to an output pipeline.

In Example 19, the subject matter of Example 18 includes, wherein the first and second logging bit vectors store a logical one to indicate completion in the respective first and second pipeline.

In Example 20, the subject matter of Example 19 includes, wherein the bitwise logical operation is an AND operation, and wherein transactions that correspond to a logical one in the result vector are considered complete.

In Example 21, the subject matter of Examples 19-20 includes, wherein the bitwise logical operation is an OR operation, and wherein transactions that correspond to a logical one in the result vector are considered complete.

In Example 22, the subject matter of Examples 18-21 includes, wherein a controller associated with the first pipeline sets a bit the first logging bit vector for a transaction executing in the first pipeline, the bit representing a completion status of the transaction executing in the first pipeline.

In Example 23, the subject matter of Examples 18-22 includes, wherein the merge circuitry sets a bit the first logging bit vector for a transaction executing in the first pipeline, the bit representing a completion status of the transaction executing in the first pipeline.

In Example 24, the subject matter of Examples 18-23 includes, wherein forwarding the completed transaction comprises transmitting an index of the result vector corresponding to the completed transaction.

In Example 25, the subject matter of Examples 18-24 includes, wherein forwarding the completed transaction comprises: using an index of the result vector corresponding to the completed transaction to obtain transaction data corresponding to the completed transaction; and transmitting the transaction data to the output pipeline.

In Example 26, the subject matter of Example 25 includes, wherein the transaction data comprises data related to a memory request.

In Example 27, the subject matter of Examples 18-26 includes, clearing bits at an index of the first and second logging bit vectors that corresponds to the completed transaction.

In Example 28, the subject matter of Examples 18-27 includes, wherein the first pipeline comprises a fast sequential access pipeline.

In Example 29, the subject matter of Examples 18-28 includes, wherein the second pipeline comprises a slow random access pipeline.

In Example 30, the subject matter of Examples 18-29 includes, wherein the first logging bit vector and the second logging bit vector are of the same size.

In Example 31, the subject matter of Examples 18-30 includes, wherein the first logging bit vector and the second logging bit vector are each 256 bits.

In Example 32, the subject matter of Examples 18-31 includes, wherein the merge circuitry is included in a memory controller chiplet in a chiplet system.

In Example 33, the subject matter of Example 32 includes, wherein the merge circuitry is disposed on an output path of the memory controller chiplet, the output path being between the memory controller chiplet and memory managed by the memory controller chiplet.

In Example 34, the subject matter of Example 33 includes, wherein memory managed by the memory controller includes memory on the memory controller chiplet and memory that is not on the memory controller chiplet.

Example 35 is a machine-readable medium including instructions, which when executed by a memory controller having merge circuitry, cause the memory controller to: perform a bitwise logical operation on a first logging bit vector and a second logging bit vector to obtain a result vector, wherein the first logging bit vector is associated with a first pipeline and the second logging bit vector is associated with a second pipeline, and wherein bits in respective index positions of the first and second logging bit vectors represent transactions; select a completed transaction from the result vector using a round-robin technique; and forward the completed transaction from the set of completed transactions to an output pipeline.

In Example 36, the subject matter of Example 35 includes, wherein the first and second logging bit vectors store a logical one to indicate completion in the respective first and second pipeline.

In Example 37, the subject matter of Example 36 includes, wherein the bitwise logical operation is an AND operation, and wherein transactions that correspond to a logical one in the result vector are considered complete.

In Example 38, the subject matter of Examples 36-37 includes, wherein the bitwise logical operation is an OR operation, and wherein transactions that correspond to a logical one in the result vector are considered complete.

In Example 39, the subject matter of Examples 35-38 includes, wherein a controller associated with the first pipeline sets a bit the first logging bit vector for a transaction executing in the first pipeline, the bit representing a completion status of the transaction executing in the first pipeline.

In Example 40, the subject matter of Examples 35-39 includes, wherein the merge circuitry sets a bit the first logging bit vector for a transaction executing in the first pipeline, the bit representing a completion status of the transaction executing in the first pipeline.

In Example 41, the subject matter of Examples 35-40 includes, wherein forwarding the completed transaction comprises transmitting an index of the result vector corresponding to the completed transaction.

In Example 42, the subject matter of Examples 35-41 includes, wherein forwarding the completed transaction comprises: using an index of the result vector corresponding to the completed transaction to obtain transaction data corresponding to the completed transaction; and transmitting the transaction data to the output pipeline.

In Example 43, the subject matter of Example 42 includes, wherein the transaction data comprises data related to a memory request.

In Example 44, the subject matter of Examples 35-43 includes, wherein the memory controller is to perform operations including: clearing bits at an index of the first and second logging bit vectors that corresponds to the completed transaction.

In Example 45, the subject matter of Examples 35-44 includes, wherein the first pipeline comprises a fast sequential access pipeline.

In Example 46, the subject matter of Examples 35-45 includes, wherein the second pipeline comprises a slow random access pipeline.

In Example 47, the subject matter of Examples 35-46 includes, wherein the first logging bit vector and the second logging bit vector are of the same size.

In Example 48, the subject matter of Examples 35-47 includes, wherein the first logging bit vector and the second logging bit vector are each 256 bits.

In Example 49, the subject matter of Examples 35-48 includes, wherein the merge circuitry is included in a memory controller chiplet in a chiplet system.

In Example 50, the subject matter of Example 49 includes, wherein the merge circuitry is disposed on an output path of the memory controller chiplet, the output path being between the memory controller chiplet and memory managed by the memory controller chiplet.

In Example 51, the subject matter of Example 50 includes, wherein memory managed by the memory controller includes memory on the memory controller chiplet and memory that is not on the memory controller chiplet.

Example 52 is an apparatus, comprising: means for performing, by a memory controller having merge circuitry, a bitwise logical operation on a first logging bit vector and a second logging bit vector to obtain a result vector, wherein the first logging bit vector is associated with a first pipeline and the second logging bit vector is associated with a second pipeline, and wherein bits in respective index positions of the first and second logging bit vectors represent transactions; means for selecting, by the memory controller having merge circuitry, a completed transaction from the result vector using a round-robin technique; and means for forwarding, by the memory controller having merge circuitry, the completed transaction from the set of completed transactions to an output pipeline.

In Example 53, the subject matter of Example 52 includes, wherein the first and second logging bit vectors store a logical one to indicate completion in the respective first and second pipeline.

In Example 54, the subject matter of Example 53 includes, wherein the bitwise logical operation is an AND operation, and wherein transactions that correspond to a logical one in the result vector are considered complete.

In Example 55, the subject matter of Examples 53-54 includes, wherein the bitwise logical operation is an OR operation, and wherein transactions that correspond to a logical one in the result vector are considered complete.

In Example 56, the subject matter of Examples 52-55 includes, wherein a controller associated with the first pipeline sets a bit the first logging bit vector for a transaction executing in the first pipeline, the bit representing a completion status of the transaction executing in the first pipeline.

In Example 57, the subject matter of Examples 52-56 includes, wherein the merge circuitry sets a bit the first logging bit vector for a transaction executing in the first pipeline, the bit representing a completion status of the transaction executing in the first pipeline.

In Example 58, the subject matter of Examples 52-57 includes, wherein the means for forwarding the completed transaction comprise means for transmitting an index of the result vector corresponding to the completed transaction.

In Example 59, the subject matter of Examples 52-58 includes, wherein the means for forwarding the completed transaction comprise: means for using an index of the result vector corresponding to the completed transaction to obtain transaction data corresponding to the completed transaction; and means for transmitting the transaction data to the output pipeline.

In Example 60, the subject matter of Example 59 includes, wherein the transaction data comprises data related to a memory request.

In Example 61, the subject matter of Examples 52-60 includes, means for clearing bits at an index of the first and second logging bit vectors that corresponds to the completed transaction.

In Example 62, the subject matter of Examples 52-61 includes, wherein the first pipeline comprises a fast sequential access pipeline.

In Example 63, the subject matter of Examples 52-62 includes, wherein the second pipeline comprises a slow random access pipeline.

In Example 64, the subject matter of Examples 52-63 includes, wherein the first logging bit vector and the second logging bit vector are of the same size.

In Example 65, the subject matter of Examples 52-64 includes, wherein the first logging bit vector and the second logging bit vector are each 256 bits.

In Example 66, the subject matter of Examples 52-65 includes, wherein the merge circuitry is included in a memory controller chiplet in a chiplet system.

In Example 67, the subject matter of Example 66 includes, wherein the merge circuitry is disposed on an output path of the memory controller chiplet, the output path being between the memory controller chiplet and memory managed by the memory controller chiplet.

In Example 68, the subject matter of Example 67 includes, wherein memory managed by the memory controller includes memory on the memory controller chiplet and memory that is not on the memory controller chiplet.

Example 69 is at least one machine-readable medium including instructions that, when executed by processing circuitry, cause the processing circuitry to perform operations to implement of any of Examples 1-68.

Example 70 is an apparatus comprising means to implement of any of Examples 1-68.

Example 71 is a system to implement of any of Examples 1-68.

Example 72 is a method to implement of any of Examples 1-68.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus, comprising:
an interface couplable to off-die memory; and
merge circuitry coupled to the interface, the merge circuitry configured to:
perform a bitwise logical operation on a first logging bit vector and a second logging bit vector to obtain a result vector, wherein the first logging bit vector is associated with a first pipeline and the second logging bit vector is associated with a second pipeline, and wherein bits in respective index positions of the first and second logging bit vectors represent transactions in the respective first and second pipelines;
select a completed transaction from the result vector; and
forward the completed transaction to an output pipeline.

2. The apparatus of claim 1, wherein to select the completed transaction from the result vector, the merge circuitry is configured to select the completed transaction using a round-robin technique.

3. A method, comprising:
performing, by a memory controller having merge circuitry, a bitwise logical operation on a first logging bit vector and a second logging bit vector to obtain a result vector, wherein the first logging bit vector is associated with a first pipeline and the second logging bit vector is associated with a second pipeline, and wherein bits in respective index positions of the first and second logging bit vectors represent transactions in the respective first and second pipelines;
selecting, by the memory controller having merge circuitry, a completed transaction from the result vector; and
forwarding, by the memory controller having merge circuitry, the completed transaction to an output pipeline.

4. The method of claim 3, wherein selecting the completed transaction from the result vector comprises selecting the completed transaction using a round-robin technique.

5. The method of claim 3, wherein the first and second logging bit vectors store a logical one to indicate completion in the respective first and second pipeline.

6. The method of claim 5, wherein the bitwise logical operation is an OR operation, and wherein transactions that correspond to a logical one in the result vector are considered complete.

7. The method of claim 3, wherein a controller associated with the first pipeline sets a respective bit of the first logging bit vector for a transaction executing in the first pipeline, the respective bit representing a completion status of the transaction executing in the first pipeline.

8. The method of claim 3, wherein the merge circuitry sets a respective bit of the first logging bit vector for a transaction executing in the first pipeline, the respective bit representing a completion status of the transaction executing in the first pipeline.

9. The method of claim 3, wherein forwarding the completed transaction comprises transmitting an index of the result vector corresponding to the completed transaction.

10. The method of claim 3, wherein forwarding the completed transaction comprises:
using an index of the result vector corresponding to the completed transaction to obtain transaction data corresponding to the completed transaction; and
transmitting the transaction data to the output pipeline.

11. The method of claim 10, wherein the transaction data comprises data related to a memory request.

12. The method of claim 3, comprising:
clearing bits at an index of the first and second logging bit vectors that corresponds to the completed transaction.

13. The method of claim 3, wherein the first pipeline comprises a fast sequential access pipeline.

14. The method of claim 3, wherein the second pipeline comprises a slow random access pipeline.

15. The method of claim 3, wherein the first logging bit vector and the second logging bit vector are of a same size.

16. The method of claim 3, wherein the first logging bit vector and the second logging bit vector are each 256 bits.

17. The method of claim 3, wherein the merge circuitry is included in a memory controller chiplet in a chiplet system.

18. The method of claim 17, wherein the merge circuitry is disposed on an output path of the memory controller chiplet, the output path being between the memory controller chiplet and memory managed by the memory controller chiplet.

19. The method of claim 18, wherein memory managed by the memory controller includes memory on the memory controller chiplet and memory that is not on the memory controller chiplet.

20. A non-transitory machine-readable medium including instructions, which when executed by a memory controller having merge circuitry, cause the memory controller to perform operations comprising:
   performing a bitwise logical operation on a first logging bit vector and a second logging bit vector to obtain a result vector, wherein the first logging bit vector is associated with a first pipeline and the second logging bit vector is associated with a second pipeline, and wherein bits in respective index positions of the first and second logging bit vectors represent transactions in the respective first and second pipelines;
   selecting a completed transaction from the result vector; and
   forwarding the completed transaction to an output pipeline.

\* \* \* \* \*